United States Patent
Lampon-Monk

(10) Patent No.: US 11,630,648 B2
(45) Date of Patent: *Apr. 18, 2023

(54) GENERATION OF APPLICATION BASED ON DECLARATIVE SPECIFICATION

(71) Applicant: salesforce.com, inc., San Francisco, CA (US)

(72) Inventor: Alasdair Lampon-Monk, London (GB)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,084

(22) Filed: Sep. 24, 2021

(65) Prior Publication Data

US 2022/0012023 A1 Jan. 13, 2022

Related U.S. Application Data

(63) Continuation of application No. 16/904,204, filed on Jun. 17, 2020, now Pat. No. 11,157,245.

(51) Int. Cl.
| | |
|---|---|
| *G06F 9/44* | (2018.01) |
| *G06F 8/35* | (2018.01) |
| *G06F 8/10* | (2018.01) |
| *G06F 9/54* | (2006.01) |
| *G06F 8/33* | (2018.01) |
| *G06F 8/20* | (2018.01) |

(52) U.S. Cl.
CPC ............... *G06F 8/35* (2013.01); *G06F 8/10* (2013.01); *G06F 8/24* (2013.01); *G06F 8/33* (2013.01); *G06F 9/548* (2013.01)

(58) Field of Classification Search
None
See application file for complete search history.

(56) References Cited

U.S. PATENT DOCUMENTS

| | | | |
|---|---|---|---|
| 2006/0218163 A1* | 9/2006 | Marcjan | G06F 17/00 707/999.1 |
| 2013/0145348 A1* | 6/2013 | Agovic | G06F 8/34 717/120 |

(Continued)

OTHER PUBLICATIONS

Railsguides, "The Rails Command Line," Date Unknown, pp. 1-16, [Online] [Retrieved on Jul. 1, 2020] Retrieved from the Internet <URL: https://guides.rubyonrails.org/command line.html>.

(Continued)

*Primary Examiner* — Qamrun Nahar
(74) *Attorney, Agent, or Firm* — Fenwick & West LLP

(57) ABSTRACT

An application development environment generates applications from declarative specification for the application. The declarative specification describes one or more object types and references to objects of each object type. The application development environment generates instructions (or code) from the declarative specification to generate an initial version of the application. The application development environment iteratively builds the application based on user interactions that modify the declarative specification. The application development environment modifies the instructions for the application to match the modified declarative specification. The final version of the application may be deployed on a production system.

20 Claims, 9 Drawing Sheets

(56) References Cited

U.S. PATENT DOCUMENTS

| | | | | |
|---|---|---|---|---|
| 2014/0082586 A1* | 3/2014 | Casey | .................. | G06F 8/35 |
| | | | | 717/104 |
| 2014/0372406 A1* | 12/2014 | Hoffman | ............... | G06F 16/21 |
| | | | | 707/714 |
| 2019/0147028 A1* | 5/2019 | Hare | ................... | G06F 40/174 |
| | | | | 715/221 |

OTHER PUBLICATIONS salesforce.com, "Introducing Lightning Web Components," Date Unknown, pp. 1-2, [Online] [Retrieved on Jul. 1, 2020] Retrieved from the Internet <URL: https://developer.salesforce.com/docs/componentlibrary/documentation/en/lwc>.

salesforce.com, "Lightning App Builder," Date Unknown, pp. 1-2, [Online] [Retrieved on Jul. 1, 2020] Retrieved from the Internet <URL: https://help.salesforce.com/articleView?id=lightning_app_builder_overview.htm&type=5>.

salesforce.com, "Work with Schema Builder," Date Unknown, pp. 1-4, [Online] [Retrieved on Jul. 1, 2020] Retrieved from the Internet <URL: https://trailhead.salesforce.com/en/content/learn/modules/data_modeling/schema builder>.

United States Office Action, U.S. Appl. No. 16/904,204, filed Mar. 3, 2021, eight pages.

* cited by examiner

GENERATION OF APPLICATION BASED ON DECLARATIVE SPECIFICATION

CROSS REFERENCE TO RELATED APPLICATIONS

This application is a continuation of co-pending U.S. application Ser. No. 16/904,204, filed Jun. 17, 2020, which is incorporated by reference in its entirety.

BACKGROUND

Field of Art

This disclosure relates in general to development of applications such as web applications, and in particular to declarative specification based generation of an application.

Description of the Related Art

Application developers use specialized frameworks such as user interface frameworks for developing applications such as web applications. These applications store data in databases. To develop these applications, application developers need experience with database management systems, for example, experience with structured programming language (SQL) and applications programming interfaces (APIs) for interfacing with databases. Such application development requires programming experience as well, for example, experience with programming languages such as JAVA, web technologies including hypertext markup language (HTML) and related tools, and scripting languages such as JAVASCRIPT. Furthermore, the developers need to interface their code with various third-party tools and services. Therefore, conventional techniques for application development require strong technical skills and cumbersome development and testing of the code for individual components and integration of various components.

Figure 1:
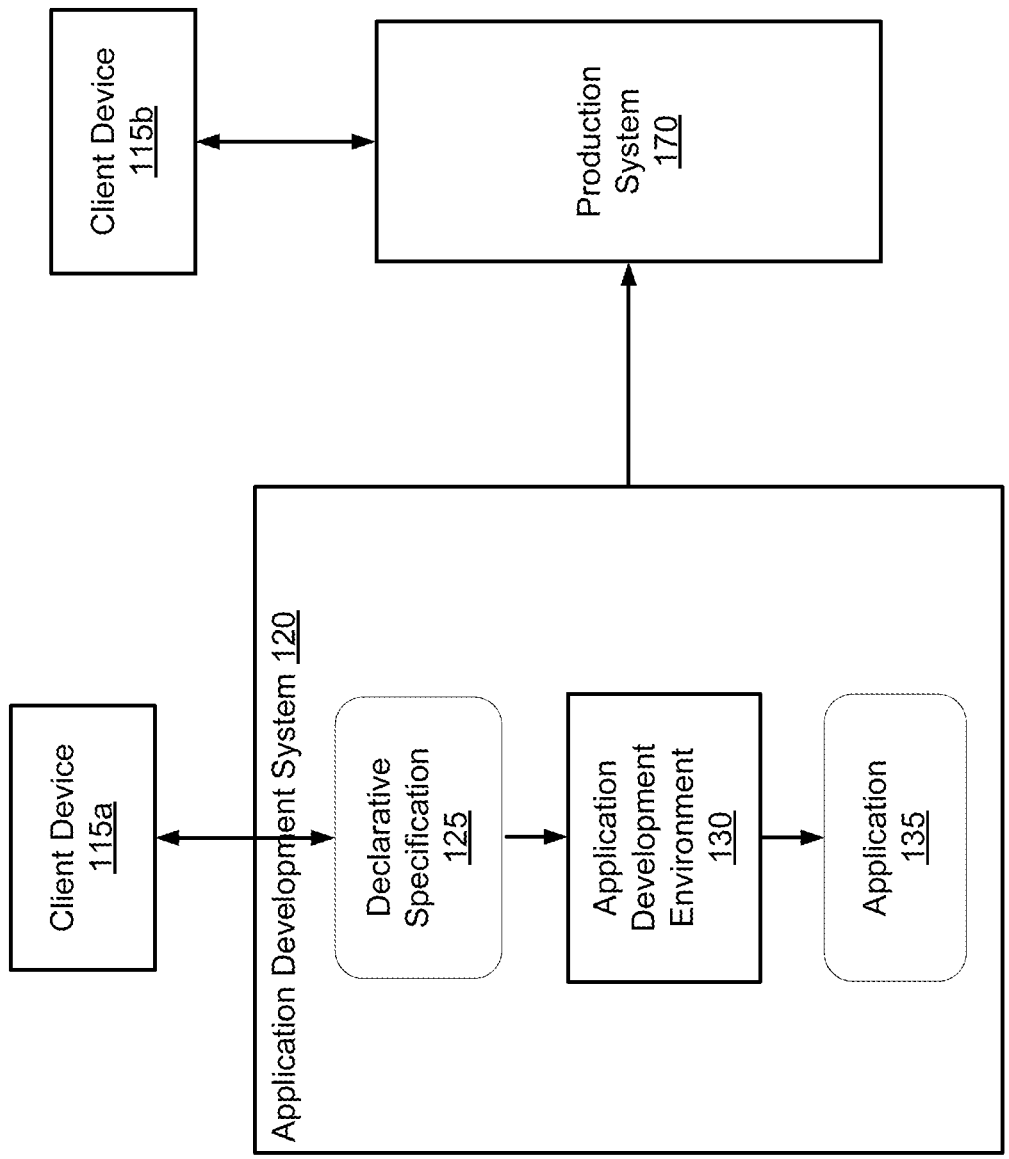
FIG. 1 is a block diagram of a system environment for generating an application from declarative specification, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

An application development environment generates applications from declarative specification for the application. The declarative specification defines the structure of the application without describing the control flow required for building the structure. The structure of the application specifies the type of data processed by the application and relations between different types of data processed by the application. The structure of the application may also specify the elements of the user interface of the application. The structure of the application may specify layout of different parts of the user interface of the application. The declarative statement is distinct from a procedural statement that specifies how the application should perform the various tasks, for example, how the application should access the data or store the data and how the application should display the data processed.

The application development environment receives the declarative specification as input from the user, for example, an application developer. The declarative specification describes one or more object types and references to objects of each object type. A reference to the object type may be associated with one of: (a) an element for data entry of objects of the object type or (b) an element for display of objects of the object type. Accordingly, the declarative specification may define user interface elements that allow users to input objects of an object type or display objects of an object type.

The application development environment generates instructions (or code) from the declarative specification to generate an initial version of the application. The instructions include: (1) instructions for generating and accessing a database schema for storing objects of each object type specified in the declarative specification, and (2) instructions for a user interface for inputting or displaying objects of an object type and (3) instructions for allowing the user interface to interact with the database schema, for example, to store an object of an object type in the database or to access objects of an object type from the database schema. The application development environment executes the generated instructions to display a user interface for the application configured to interact with the database schema.

The application development environment iteratively builds the application based on user interactions. Accordingly, a user can incrementally add features to the declarative specification and run the generated application as the features are added. For example, the user may add new object types, fields to existing object types, user interface elements, and so on. Each iteration that builds the application comprises receiving a modification to the declarative specification. For example, the modified declarative specification may include a modified version of an object type.

The application development environment modifies the instructions for the application to match the modified declarative specification, for example, the modified object type. The application development environment modifies the instructions or generates new instructions to modify the database schema to conform to the modified object types. The application development environment also modifies the instructions of the user interface to conform to the modified object types. The application development environment executes the modified instructions to display a modified user interface configured to interact with the modified database schema. This process is repeated until the application generated from the modified declarative specification matches a desired behavior, for example, a target functional specification for the application. The final version of the application may be deployed on a production system.

In an embodiment, the user interface of the application development environment includes two portions: (1) a portion that allows users to modify the declarative specification, and (2) a portion that displays a user interface of the generated application corresponding to the declarative specification. The user interface of the generated application can be executed and allows the user to try the application and check the behavior of the application. The user can continue to make changes to the declarative specification.

At any stage of the modification in which the declarative specification is in a consistent state, the user can view the corresponding application. The application development environment allows the user to execute the application using a staging sever and a test database. Accordingly, the user may be able to enter one or more values in a form displayed by the user interface of the application via the application development environment and click on a submit button to save an object of the object type having field values corresponding to the input value. The object is saved in a database to which the application is connected.

In an embodiment, the application is a web based application and the user interface of the application comprises web pages interacting with a web server which may be connected to a database. The web server executes in a sandbox environment of the application development environment.

In some embodiments, the declarative specification identifies an API call which is invoked when the user clicks on a submit button of the form or when an object type is displayed.

System Environment

FIG. 1 is a block diagram of a system environment for generating an application from declarative specification, according to one embodiment. The system environment 100 includes an application development system 120, a production system 170, and one or more client devices 115. The system environment 100 may include other systems or components not shown in FIG. 1, for example, other types of data stores, a network for allowing various systems to interact, and so on.

The application development system 120 runs an application development environment 130 that displays a development user interface, for example, via a display monitor of a client device 115a. The development user interface allows users to provide input for configuring applications, visualizing the application, and also running the application as it is being developed. In an embodiment, the application being developed is a web application. The application development environment 130 runs the web application using a staging web server that acts as a sandbox and may run on the application development system 120 or on another system connected to the application development system 120.

The application development system 120 receives a declarative specification 125 of the application being developed from the user. The declarative specification describes one or more objects. For each object type, the declarative specification 125 includes one or more fields. For each field, the declarative specification 125 may include a type of the field. A type of a field may be a text field, a numeric field, a boolean field, or any other object type defined within the specification. The type of field may be one or a predefined type made available by the application development environment 130, for example, a user type, a type of data structure such as an array, a hash table, a vector, a list, and so on. If the type of a field is not specified, the application development environment 130 uses a default type, for example, text.

Following is an example of a declarative specification 125 for an application that specifies an object type "Todo." The object type "Todo" specifies two fields, "name" and "isDone." The type of isDone field is boolean. No type is specified for the field "name" and accordingly, the application development system 120 assumes the type of the field "name" to be the default type text.

```
Lightning Application "Onboarding" {
    Tab "My Tasks" {
        Form "Todo" { }
        List "Todos" { }
    }
    Object "Todo" {
        Field "name" { }
        Field "isDone" boolean { }
    }
}
```

The declarative specification 125 specifies one or more tabs, each tab specifying the details of a portion of the user interface in the generated application. In embodiments, where the application is a web application, the tabs correspond to tabs displayed on the browser. The tab "My Tasks" includes two references to the object type "Todo." The Tab includes one or more elements, for example, a "Form" an element that allows data entry of objects of the object type "Todo." The tab "My Tasks" includes an element "List" that represents an element of the user interface for display of objects of the object type.

The application development environment 130 generates instructions (or code) for an application 135 from the declarative specification 125. The application development environment 130 executes the generated instructions to display a user interface of the application being developed and displays it via a development user interface. The application development environment 130 allows the user to execute the application being developed as the declarative specification is modified.

The application development environment 130 allows a user to provide a minimal declarative specification 125 for the application and iteratively build on the minimal declarative specification 125 by modifying the declarative specification 125 by incrementally adding new object types, fields to existing object types, and user interface elements, to the declarative specification 125. At each stage, the application development environment 130 displays a modified application 135 corresponding to the modified declarative specification 125 and allows the user to run the modified application 135 to try the behavior.

Once the declarative specification 125 has been modified sufficiently such that the behavior of the generated application 135 matches the target behavior of the application being developed, the application development environment 130 allows the user to deploy the application to a production system 170. Users can interact with the application running on the production system 170 using client devices 115b.

In an embodiment, the application generated from the declarative specification 125 is based on a component framework which includes extension and uses reusable components. Although the reusable components of the component framework make it easy to develop applications for application developers, application development using conventional tools is cumbersome since the application developer needs to figure out how the different components interact and how to make sure that the components interact with each other correctly. For example, the application developer needs to study the interfaces of the specific components and make sure that that the right component is being used and invoked properly. In contrast, embodiments allow users to specify a declarative specification that simply identifies the object types and their inter-relations as well as their relations to the user interfaces. This makes the development of applications much simpler and allows the application developers to focus on the high-level design of the applications. The application development environment 130 determines based on the declarative specification, which components need to be used and connects them as necessary for building the application.

In an embodiment, an application developer can build a version of the application using the declarative specification and inspect the components used. The application developer may modify the generated application, for example, by replacing some of the components selected by the application development environment 130 with other components. The modified generated application is deployed on a production system 170.

The production system 170 receives live requests from users and processes them. For example, if the application is configured to perform certain transactions, the production system 170 provides the user interface of the application to actual users that perform the transactions against real data. In contrast, the application development environment 130 presents a user interface to a developer or tester for running against test data. However, the application development environment 130 presents a test data that matches the actual data of the production system 170, for example, the test data may have the same database schema as the production system.

In some embodiment, the production system is a multi-tenant system. A multi-tenant system stores data of one or more tenants. Each tenant may be an enterprise or an organization that represents a customer of the multi-tenant system. Each tenant may have multiple users that interact with the multi-tenant system via client devices. Various elements of hardware and software of the multi-tenant system may be shared by multiple tenants.

In one embodiment, a multi-tenant system implements a web-based customer relationship management (CRM) system. For example, the multi-tenant system may store applications configured to implement and execute CRM software applications. As an example, one tenant might be a company that employs a sales force where each salesperson uses a client device to manage their sales process. Thus, a user might maintain contact data, leads data, customer follow-up data, performance data, goals and progress data, etc., all applicable to that user's personal sales process.

A multi-tenant system includes a data store that stores data for various tenants of the multi-tenant system. It is transparent to tenants that their data may be stored in a data store that is shared with data of other tenants. The data store may store data for different tenants in separate physical structures, for example, separate database tables or separate databases. Alternatively, the data store may store data of multiple tenants in a shared structure. For example, user accounts for all tenants may share the same database table. However, the multi-tenant system stores additional information to logically separate data of different tenants. Accordingly, data of one tenant is kept logically separate from that of other tenants so that one tenant does not have access to another tenant's data, unless such data is expressly shared.

The application development system 120, the production system 170, and client devices 115 shown in FIG. 1 represent computing systems. A computing system can be a conventional computer system executing, for example, a Microsoft™ Windows™-compatible operating system (OS), Apple™ OS X, and/or a Linux OS. A computing system such as a client device can be a laptop, desktop, or any device with a display monitor for displaying a user interface.

The application development system 120, the production system 170, and the client devices 115 may interact with each other via a network (not shown in FIG. 1). The network uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

System Architecture

Figure 2:
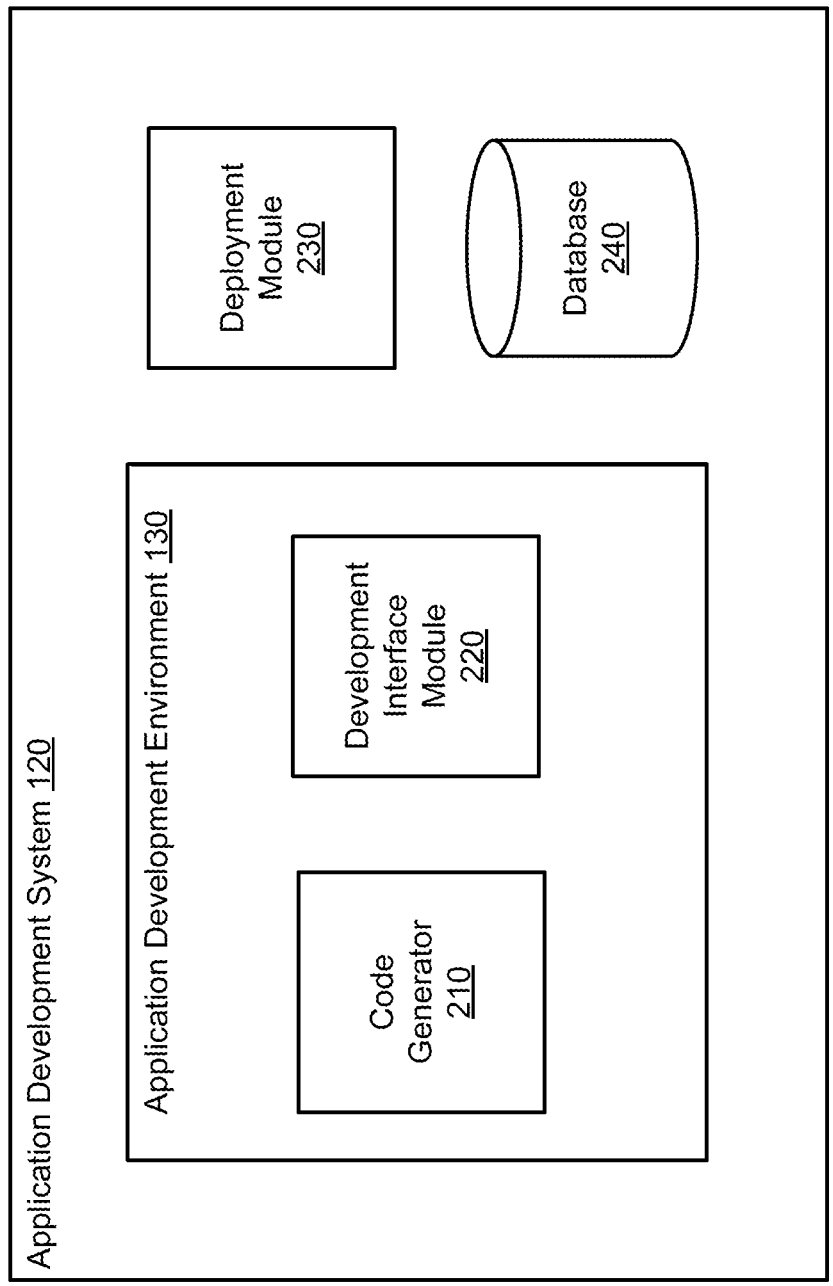
FIG. 2 is a block diagram illustrating architecture of an application development system for building an application from declarative specification, according to one embodiment.

FIG. 2 is a block diagram illustrating architecture of an application development system for building an application from declarative specification, according to one embodiment. The application development system includes an application development environment 130, a deployment module 230, and a database 240. Other embodiments can have different and/or other components than the ones described here. Furthermore, the functionalities described herein can be distributed among the components in a different manner.

The application development environment 130 includes a code generator 210 and a development interface module 220. The application development environment 130 reads a declarative specification 125 and invokes the code generator 210 to generate code for the application 135. The generated code includes code for generating a database schema for storing objects of each object type specified in the declarative specification 125 as well as code for accessing objects of each object type including code to storing objects of the object type and code for retrieving objects of the object type. The term code is also referred to herein as instructions.

The development interface module 220 configures and displays a user interface that allows a user to modify the declarative specification 125 and view an application corresponding to the modified declarative specification that can be executed within the user interface of the development interface module 220. In an embodiment, the development interface module 220 displays a user interface with two portions, for example, two panels, one for receiving modifications to the declarative specification and other for displaying user interface of the application executing within the application development environment 130 and receiving user interactions performed using the user interface of the application.

The code generator 210 reads the declarative specification 125 and generates the code for the application 135 based on the declarative specification. In an embodiment, the code generator 210 receives the initial version of the declarative specification 125 and generates the initial version of the application 135. Subsequently, the code generator receives modifications to the declarative specification 125 and correspondingly modifies the instructions of the application 135. The modifications to the declarative specification received by the application development environment 130 include addition of object types, deletion of object types, modifications of object types, and addition or deletion of references to object types including user interface elements for data entry of objects of the object type and user interface elements for display of objects of the object type.

In an embodiment, the code generator 210 identifies the modifications to the declarative specification by comparing the modified declarative specification with the previous version of the declarative specification, for example, by comparing the object types by comparing the fields of the object types, and by comparing the references to the object types across the two versions. In another embodiment, the application development environment 130 receives specific instructions from users specifying the modifications. The code generator 210 receives these instructions and determines the modifications to the declarative specification. For example, the application development environment 130 may receive a request to add or delete an object type and the code generator 210 receives this information. As another example, the application development environment 130 may receive a request to add, delete, or modify a field of an existing object type and the code generator 210 receives this information.

If the code generator 210 receives an indication that a new object type is added to the declarative specification, the code generator 210 generates database commands to create a storage structure for storing objects of the object type, for example, a table. For example, the code generator 210 generates a command to create a table that has fields matching the object type and executes the command. If the code generator 210 receives an indication that an object type is deleted from the declarative specification, the code generator 210 may generate a database command to drop the storage structure previously created for storing objects of the object type, for example, the code generator 210 may generate a drop table command and execute it. Alternatively, the application development environment 130 may mark the table for deletion at some future stage. Furthermore, the generated instructions are modified to look to any references to the tables marked for deletion and flag an error if such instructions are encountered. If the code generator 210 receives an indication that an existing object type is modified in the declarative specification, the code generator 210 generates database commands to modify the storage structure previously created for storing objects of the object type, for example, an alter table command.

If the code generator 210 receives an indication that a new reference to an object type is added the code generator 210 modifies the user interface and code of the application that allows the user interface to interact with the database accordingly. If the code generator 210 receives an indication that a user interface element for data entry of objects of an object type is added to the declarative specification, the code generator 210 adds a form to the user interface of the application with data input fields matching the fields of the object type. The submit button of the form is configured to cause the data received by the input fields to be used to generate an object of the object type which is stored in the database in a table corresponding to the object type.

If the code generator 210 receives an indication that a user interface element for display of objects of an object type is added to the declarative specification, the code generator 210 adds a display table in the user interface of the application with columns matching the fields of the object type. The generated code of the application is configured to execute a database query that retrieves objects of the object type from the corresponding table of the database and format them for display as the display table in the user interface of the application.

If the code generator 210 receives an indication that an object type is modified, for example, by addition of a field, deletion of a field, or by changing type of a field, the code generator 210 generates instructions for altering the table storing objects of the object type to match the modified object type and executes the generated instructions. The code generator 210 also identifies all the references to the object type and modifies the instructions of the application corresponding to the references.

For example, the code generator 210 identifies all user interface elements for data entry of the object type and modifies the instructions of the form according to the modifications to the object type. If the modifications to the object type indicate that a new field was added to the object type, the code generator 210 adds a data input field corresponding to the new field of the object type to each user interface elements for data entry (e.g., forms) of the object type. If the modifications to the object type indicate that a field was removed from the object type, the code generator 210 removes the data input field corresponding to the deleted field of the object type from each user interface elements for data entry (e.g., forms) of the object type. If the modifications to the object type indicate that a type of a field of the object type was changed, the code generator 210 changes the data input field corresponding to the modified field from each user interface elements for data entry (e.g., forms) of the object type to conform to a widget that matches the new type.

As another example, the code generator 210 identifies all user interface elements for display (e.g., table) of the object type and modifies the instructions according to the modification of the object type. For example, if the modifications to the object type indicate that a field was added to the object type, the code generator 210 adds a display field corresponding to the new field of the object type to each user interface elements for display (e.g., a display table) of the object type. If the modifications to the object type indicate that a field was removed from the object type, the code generator 210 removes the display field corresponding to the deleted field of the object type from each user interface elements for display (e.g., table) of the object type. If the modifications to the object type indicate that a type of a field of the object type was changed, the code generator 210 changes the display field corresponding to the modified field from each user interface elements for display (e.g., table) of the object type to conform to a display type that matches the new field type.

The application development environment 130 allows the user to use the user interface of the application to execute any functionality after each modification to the declarative specification. For example, the user can enter values to a data input form to create a new object and the user interface updates the table in the database with a new object corresponding to the input value. The application also updates any display elements, for example, display tables to show the new object that was added. If the object type is associated with any APIs, the application invokes the corresponding APIs if the declarative specification indicates that the API should be invoked by the data entry elements or display elements.

The database 240 stores data of the application 135. Accordingly, the database 240 includes a database schema that matches the object types of the declarative specification. The application development environment 130 continuously modifies the database schema as the declarative specification is modified so that the database schema continues to match the data structures and object types defined in the declarative specification. In an embodiment, the structure and type of the database 240 matches the structure and type of the database of a production system 170 so that the development of the application is performed on a development environment that is close to the environment in which the application is expected to be deployed.

The deployment module 230 deploys an application generated by the application development environment 130 on a production system 170. In an embodiment, the deployment module modifies the configuration of the application to refer to databases and servers used by the production system 170. The deployment module 230 sends the executable instructions of the application to the production system 170 and the production system 170 hosts the application for users. In an embodiment, the production system 170 is a multi-tenant system that hosts the application for users of a particular tenant of the multi-tenant system.

Overall Process

Figure 3:
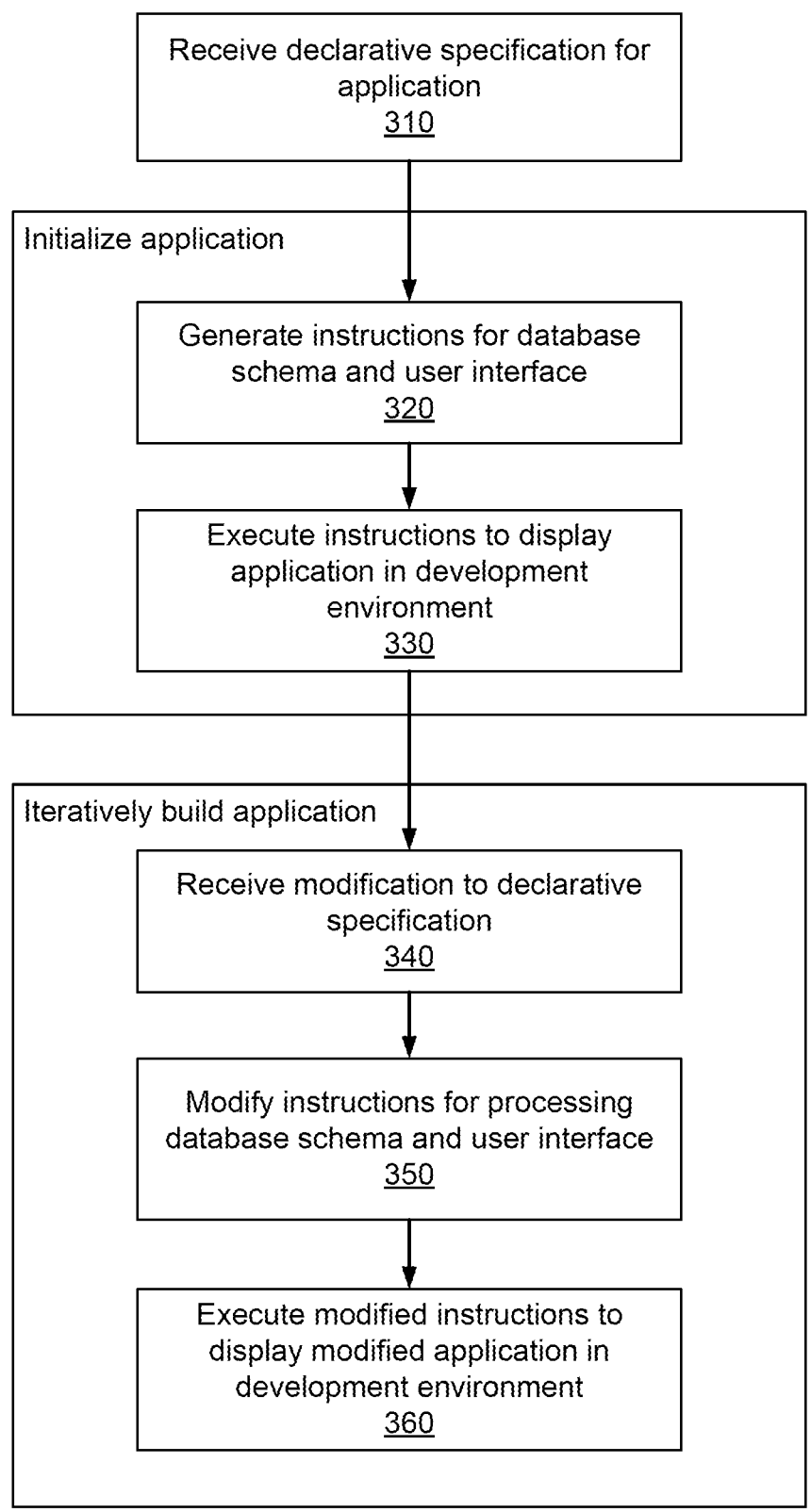
FIG. 3 is a flow chart illustrating the overall process for generating an application from declarative specification, according to an embodiment.

FIG. 3 is a flow chart illustrating the overall process for generating an application from declarative statement according to an embodiment. Other embodiments can perform the steps of these flowcharts in different orders. Other embodiments can include different and/or additional steps than the ones described herein.

The application development environment 130 receives 310 a declarative specification 125 for an application. The describing declarative specification 125 may include specification of an object type including one or more fields, and one or more references to the object type. A reference to the object type may be associated with a user interface element for data entry of objects of the object type or a user interface element for display of objects of the object type.

The application development environment 130 generates an initial version of the application by generating 320 code or instructions from the received declarative specification. The application development environment 130 generates instructions for generating and accessing a database schema for storing objects of any object types specified by the declarative specification. These may include commands for creating any tables in the database. The application development environment 130 also generates instructions for a user interface for inputting or displaying objects of the object type and interacting with the database schema.

The application development environment 130 executes 330 the generated instructions to generate the database schema, for example, by crating any necessary tables of the database. The application development environment 130 executes 330 to generate and display a user interface for the application. The generated user interface of the application is configured to interact with the database schema.

The application development environment 130 iteratively builds the application based on user interaction performed with a user via the user interface of the application development environment 130. Each iteration comprises the following steps. The development environment 130 receives 340 a modification to the declarative specification. The modified declarative specification may include a modified version of an object type of the declarative specification, for example, a new field may be added to the object type, a field may be deleted from the object type of a field type may be modified. The modified declarative specification may also include modifications to the user interface elements of the application, for example, the user interface elements that refer to the object types.

The application development environment 130 modifies 350 the instructions for the application based on the modifications to the declarative schema. For example, if the structure of an object type is modified, the application development environment 130 modifies the database schema to match the modified object type. If the user interface elements that refer to the object types are modified, the application development environment 130 modifies the user interface to match the modified declarative specification.

The application development environment 130 executes 360 the modified instructions to display a modified user interface configured to interact with the modified database schema. This process is repeated until the declarative specification generates an application that is ready for deployment to a production system 170. If the declarative specification generates an application that is ready for deployment to a production system 170, the deployment module 230 deploys the generated application to the production system 170.

Application Development Environment User Interface

FIG. 4A-E show examples of user interfaces of an application generated by the development environment from declarative specification, according to an embodiment. The user interfaces displayed are exemplary and various embodiments may display other types of user interfaces.

Figure 4A:
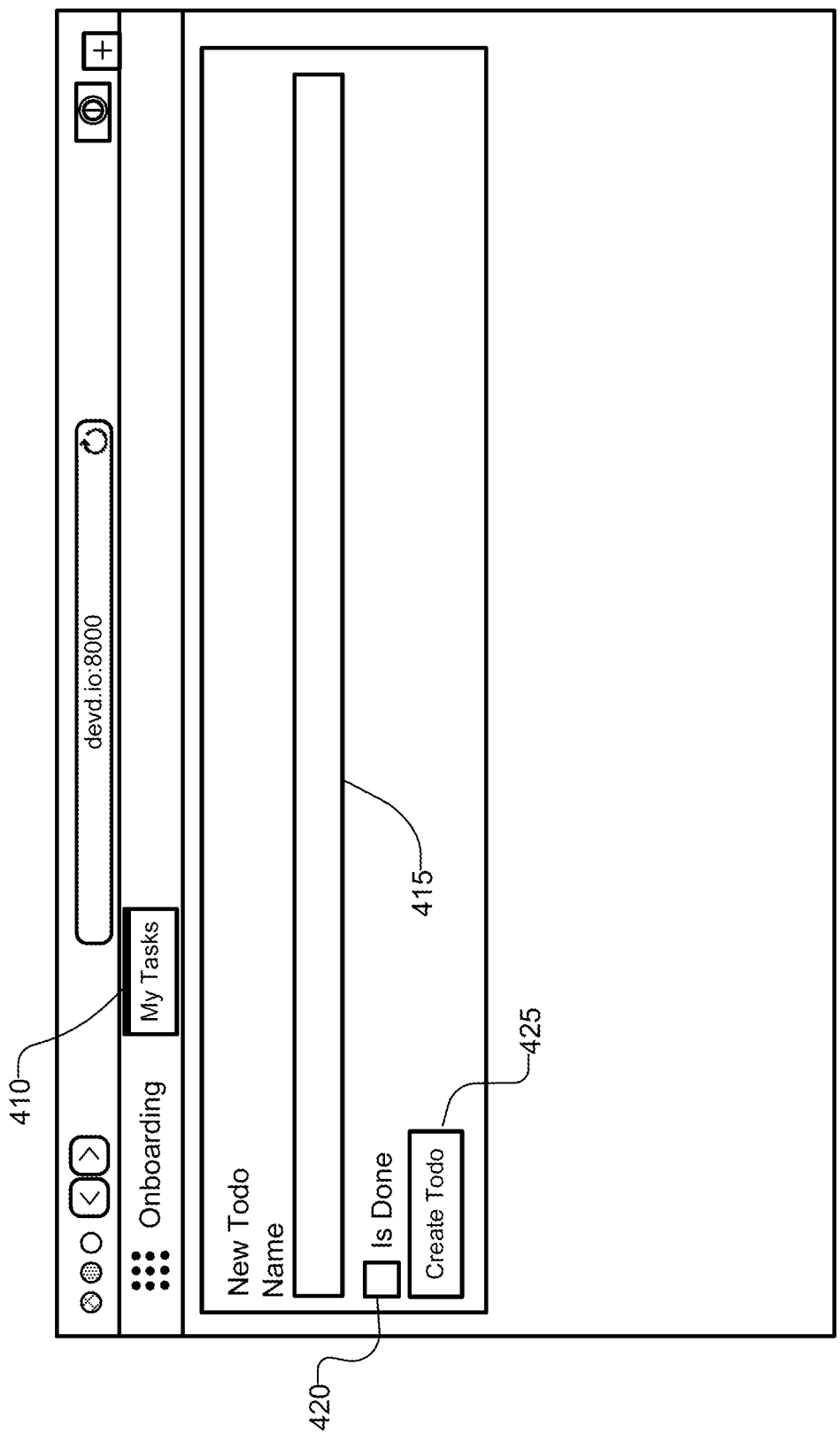
FIG. 4A-E show examples of user interfaces of an application generated by the application development environment from declarative specification, according to an embodiment.

FIG. 4A shows an example user interface of an application generated from the following declarative specification (version V1) that specifies a user interface element for data entry (referred to as Form) of objects of the object type "Todo."

```
Lightning Application "Onboarding" { # version V1
    Tab "My Tasks" {
        Form "Todo" { }
    }
    Object "Todo" {
        Field "name" { }
        Field "isDone" boolean { }
    }
}
```

As shown in FIG. 4A, the user interface includes a text input field 415 for inputting values of the "name" field which is of text type. The user interface shown in FIG. 4A includes a checkbox input field 420 for inputting values of the "isDone" field which is of boolean type. The user interface also shows a submit button 425 labelled "Create Todo" for creating an object of type Todo when the user clicks on the button 425. The application stores the new object in a table of a database connected to the application when a user clicks on the button 425.

Figure 4B:
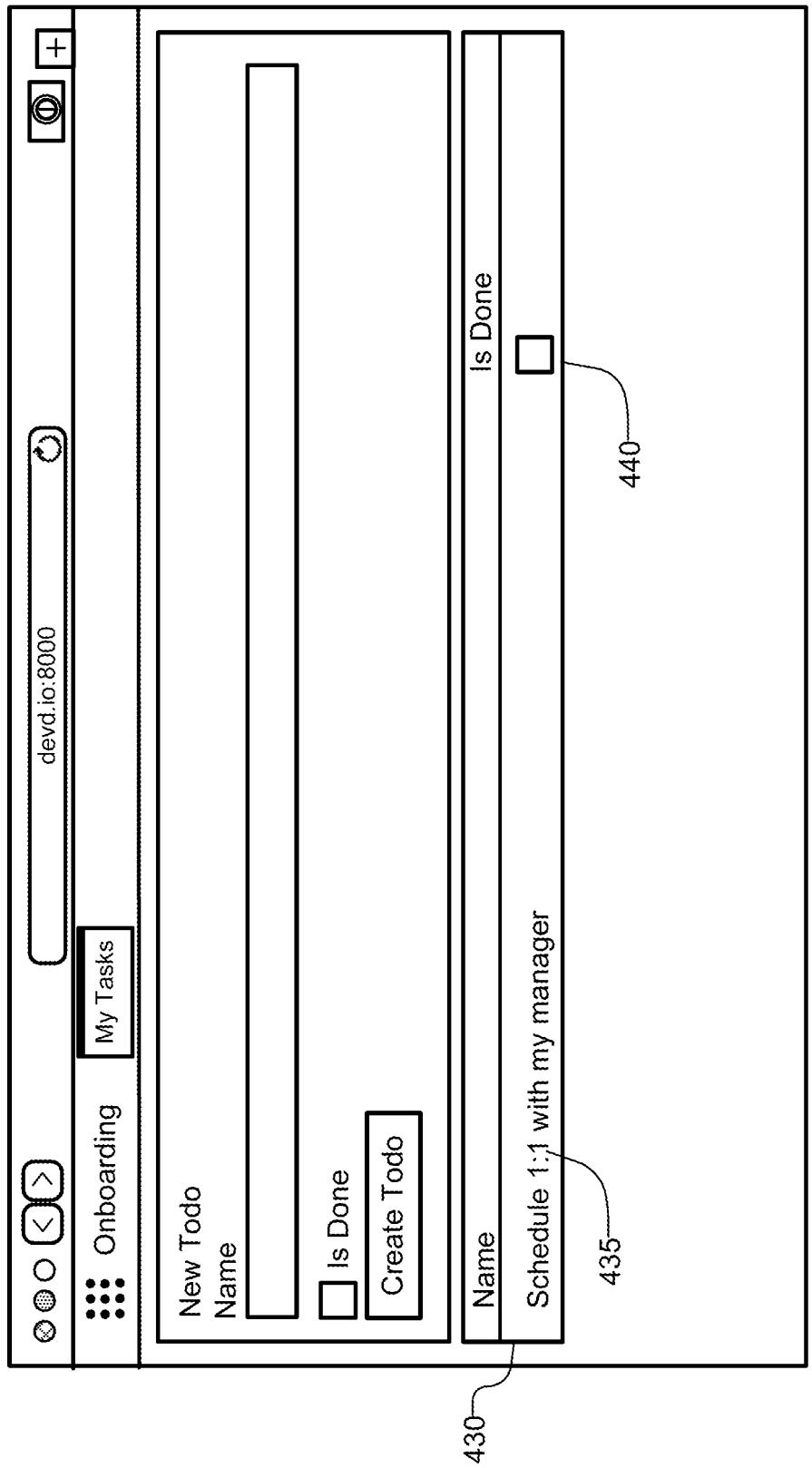

FIG. 4B shows an example user interface of an application generated from the following declarative specification (version V2). The version V2 of the declarative specification is obtained by modifying the version V1 by adding an element for display (List) of objects of the object type "Todo." Accordingly, the user interface shown in FIG. 4B shows a table 430 displaying objects of object type with a text field 435 displaying the field "name" and a checkbox 440 displaying the boolean "isDone." Any object created by the user using the form for creating objects are saved in the database and displayed in the table 430.

```
Lightning Application "Onboarding" { # version V2
    Tab "My Tasks" {
        Form "Todo" { }
```

-continued

```
    List "Todos" { }
  }
  Object "Todo" {
    Field "name" { }
    Field "isDone" boolean { }
  }
}
```

Figure 4C:
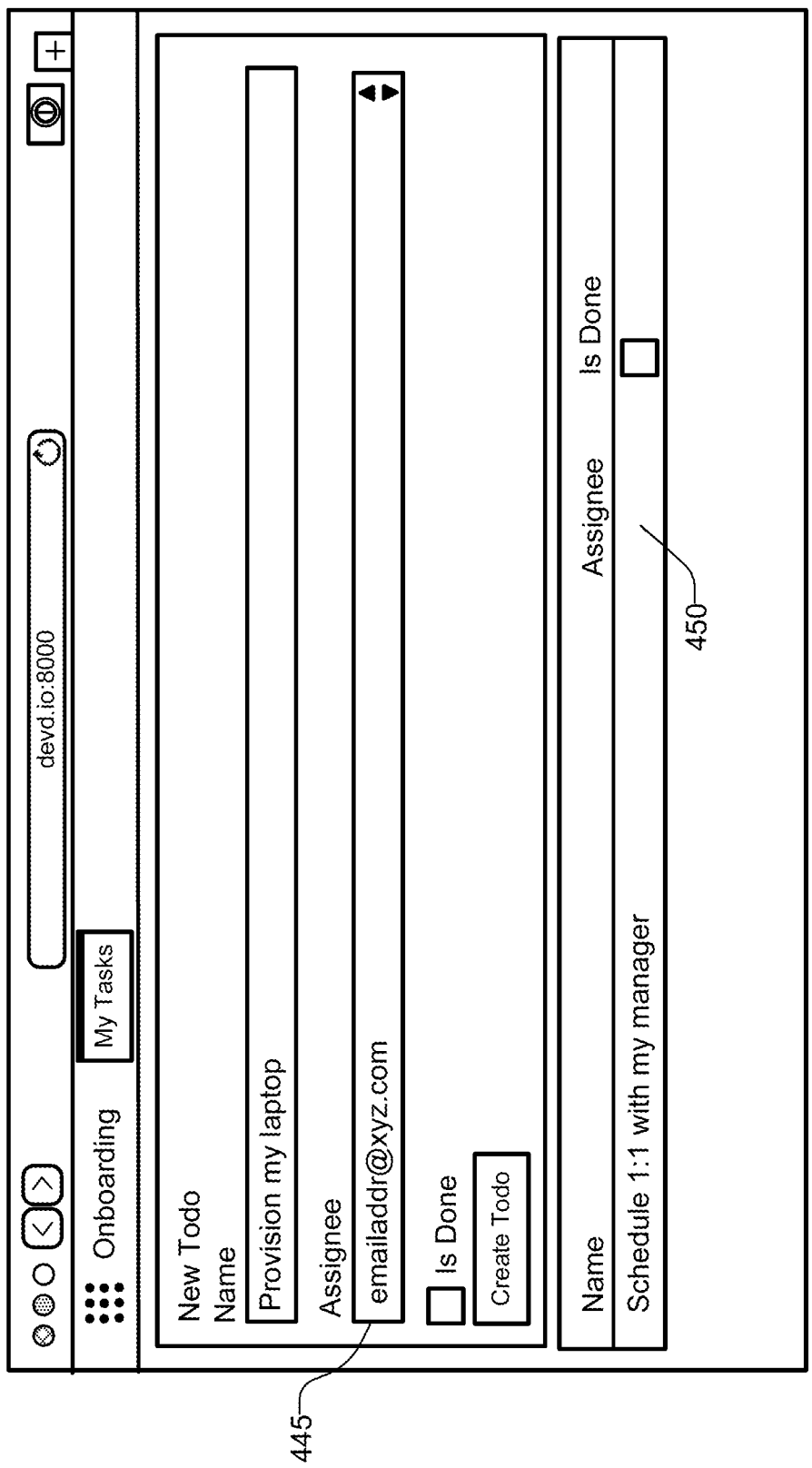

FIG. 4C shows an example user interface generated from the following declarative specification (version V3) in which a field "assignee" is added to the object type Todo. The field "assignee" is of a predefined type "User." The database used by the application includes a table storing values of objects of object type "User." The application development environment 130 determines that an attribute of the object type "Todo" is another object type "User." Accordingly, the application development environment 130 generates instructions for the user interface of the application that adds a data input field for a user type. Since the "User" type is also an object type, the application development environment 130 uses a widget that allows a user to inspect existing instances of the object type User, for example, a drop-down list 445 that allows users to scroll through existing objects of type "User" to be able to select a particular type to be entered.

```
Lightning Application "Onboarding" { # version V3
  Tab "My Tasks" {
    Form "Todo" { }
    List "Todos" { }
  }
  Object "Todo" {
    Field "name" { }
    Field "assignee" User { }
    Field "isDone" boolean { }
  }
}
```

Accordingly, if the application development environment 130 encounters a field of another object type, the application development environment 130 generates a data input field that fetches the existing values of the other object type and allows user to scroll through the existing objects and select a particular object for use as an attribute of the object type being populated by the form.

Figure 4D:
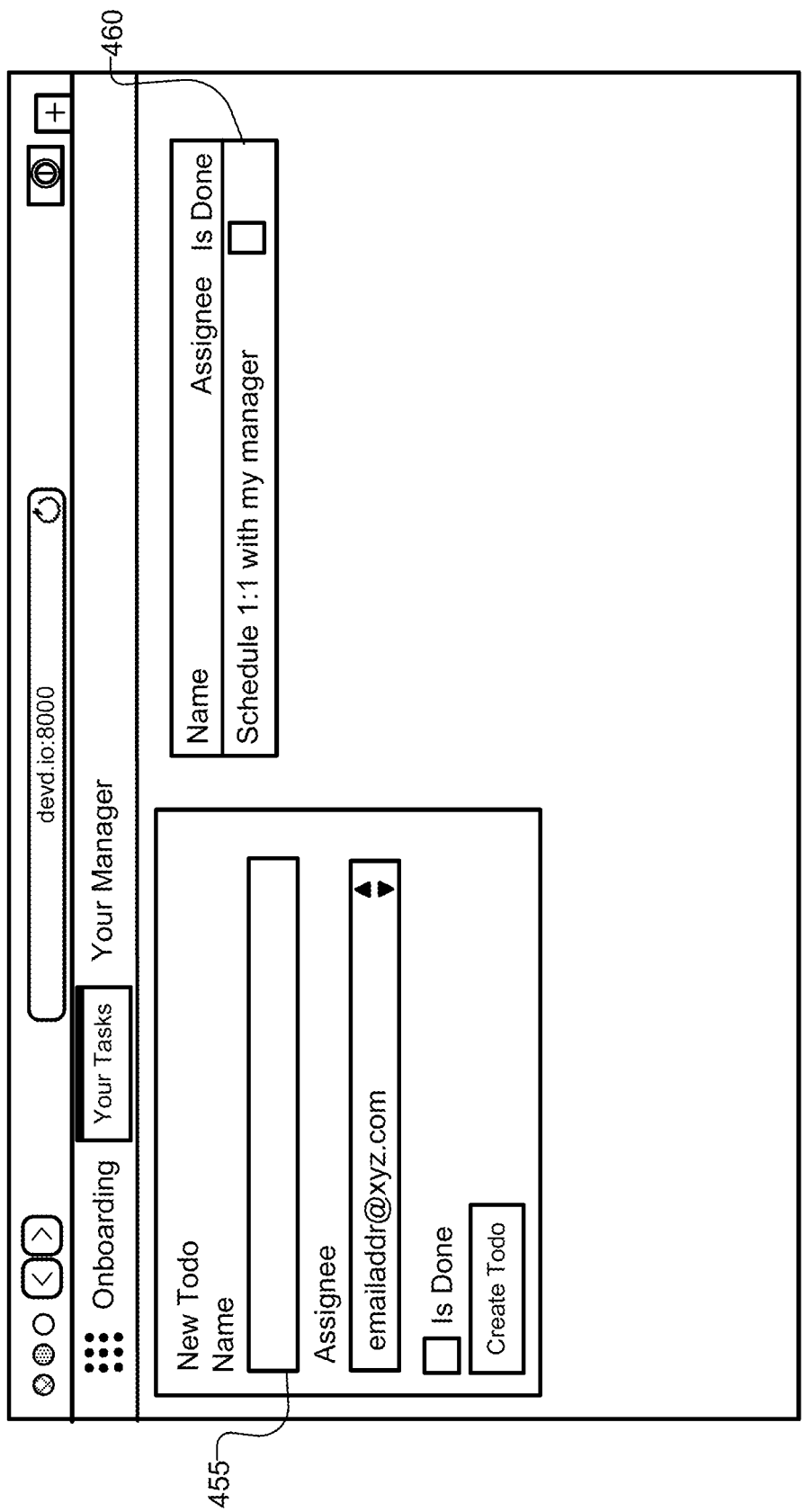

FIG. 4D shows an example user interface generated from the following declarative specification having version V4. The following declarative specification specifies the layout of the user interface. In particular, the declarative specification specifies that the elements Form and List are organized as a "Stack" that has a horizontal layout as shown in FIG. 4D.

```
Lightning Application "Onboarding" { # version V4
  Tab "My Tasks" {
    Stack {
      Direction = "horizontal"
      Form "Todo" { }
      List "Todos" { }
    }
  }
  Object "Todo" {
    Field "name" { }
    Field "isDone" boolean { }
  }
}
```

Figure 4E:
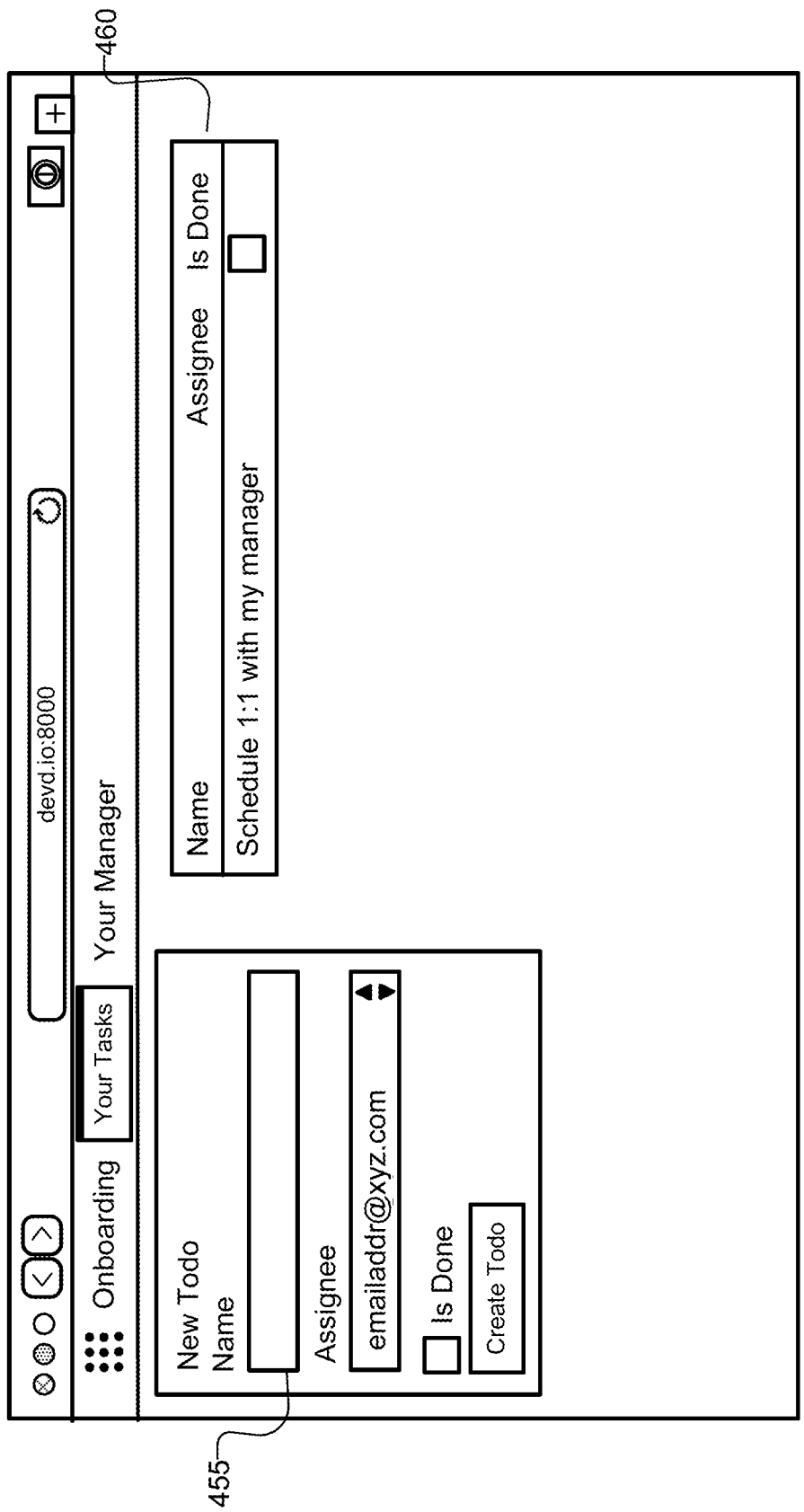

FIG. 4E shows an example user interface generated from the following declarative specification version V5. The declarative specification provides further details of the layout. More specifically, the declarative specification specifies want portion of the stack is allotted to displaying each element. Accordingly, for a plurality of elements being displayed within the stack, the declarative specification specifies a percentage of the user interface that is allotted to each element.

```
Lightning Application "Onboarding" { # version V5
  Tab "My Tasks" {
    Stack {
      Direction = "horizontal"
      template = "25/75"
      Form "Todo" { }
      List "Todos" { }
    }
  }
  Object "Todo" {
    Field "name" { }
    Field "isDone" boolean { }
  }
}
```

Accordingly, the declarative specification provides a description of what the application includes without providing detailed instructions of how each feature of the application should be implemented. The application development environment generates instructions that determine how each feature of the application is implemented.

Alternative Embodiments

In some embodiments, the declarative specification includes declaration for multiple applications. For example, the declarative specification version V6 shown as following specifies a Lightning application and a Heroku application. The Lightning application specifies the object type "Todo" and the Heroku application provides a data synchronization service between the Lightning application and data stored in a database, for example, a Postgres database. The declaration of the Heroku application identifies the object type "Todo" of the Lightning application. The application development environment 130 generates instructions that cause instances of the object type "Todo" to be synchronized with data of the Heroku application. Both Heroku application and the Lightning application are predefined types of application supported by the declarative specification. The type of application indicates the type of instructions that are generated by the application development environment 130 for each application.

More specifically, the declarative specification version V6 identifies a resource, i.e., a Postgres database associated with the Heroku application. The Postgres database stores a table that is synchronized with the objects of object type "Todo." Accordingly, the application development environment 130 allows users to use a declarative specification to specify multiple applications and interactions between these applications, for example, synchronization between data stored in two data stores.

```
Lightning Application "Onboarding" { # version V6
  Tab "My Tasks" {
    Form "Todo" { }
    List "Todos" { }
  }
```

```
Object "Todo" {
    Field "name" { }
    Field "isDone" boolean { }
}
}
Heroku Application "Onboarding-api" {
    Resource postgres {
        syncs = "Todos" { }
    }
}
```

If a user uses the application development environment 130 to view the user interface of the application, the user may update a data entry corresponding to an object of object type "Todo". The generated instructions of the application cause the update to be made to the database schema storing data of the Lightning application as well as the corresponding table of the Postgres database that is synchronized with the table storing objects of object type "Todo".

In another embodiment, the declarative specification associates the application with an application programming interface (API). For example, the declarative specification associates the object type with an API and the application development environment 130 generates instructions for the application to populate objects of the object type by executing the instructions of the API. For example, the API may obtain a value from a web service to populate fields of an object of the object type.

In another embodiment, the declarative specification identifies an application programming interface (API) and associated the element for data entry of objects of the object type with an invocation of the API. Accordingly, the application development environment generates instructions for the user interface of the application causing the user interface to provide data input to the fields of the user interface as parameters to an invocation of the API. For example, the API may be invoked when a user presses a submit button of a form of the user interface and the values input to the form are provided as parameters to the parameter. The API may cause the application to interface with a third-party system, for example, a web service to obtain a result from the third-party system.

The computer-implemented method of claim 1, wherein the declaration specification identifies an application programming interface (API). Accordingly, an element for display of objects of the object type, for example, a "List" specifies an invocation of the API. The generated instructions for the application cause the application to populate a value of a field of the object by invoking the API. The field is saved in the database schema and also displayed in the user interface. For example, a field may populate an attribute describing the current weather condition by invoking an API of a web service.

In some embodiments, the application development environment allows users to start development of an application using a declarative specification. After the application has been built to incorporate a significant number of features, further development may be done to incorporate additional features using procedural languages or constructs. For example, the application development may support in addition to the declarative language support, support for procedural languages. For example, a scripting language support may be provided. APIs or functions developed using the procedural language support may be invoked similar to the API invocation described herein.

Computer Architecture

Figure 5:
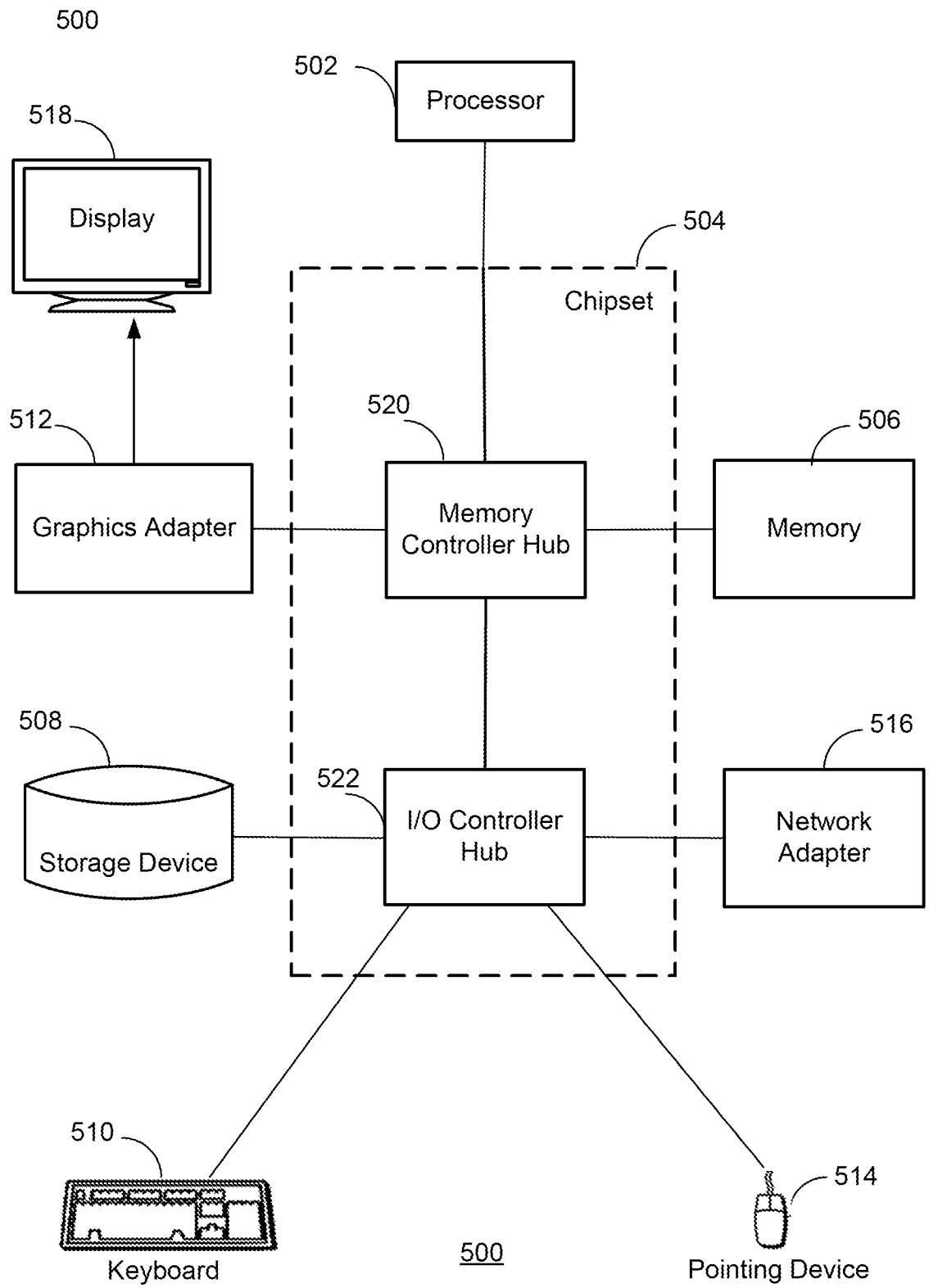
FIG. 5 is a block diagram illustrating a functional view of a typical computer system according to one embodiment.

FIG. 5 is a high-level block diagram illustrating a functional view of a typical computer system for use as one of the entities illustrated in the environment 100 of FIG. 1 according to an embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is a non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 500. The graphics adapter 512 displays images and other information on the display 518. The network adapter 516 couples the computer system 500 to a network.

As is known in the art, a computer 500 can have different and/or other components than those shown in FIG. 5. In addition, the computer 500 can lack certain illustrated components. For example, a computer system 500 may lack a keyboard 510 and a pointing device 514. Moreover, the storage device 508 can be local and/or remote from the computer 500 (such as embodied within a storage area network (SAN)).

The computer 500 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 508, loaded into the memory 506, and executed by the processor 502.

The types of computer systems 500 used by the entities of FIG. 1 can vary depending upon the embodiment and the processing power used by the entity. For example, a client device 115 may be a mobile phone with limited processing power, a small display 518, and may lack a pointing device 514. The multi-tenant system 120, in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:

1. A computer-implemented method for generating an application from a declarative specification, the computer-implemented method comprising:
    receiving the declarative specification comprising a description of an object type, and one or more references to objects of the object type;
    generating an initial version of the application from the declarative specification comprising, a set of instructions for configuring a user interface for inputting or displaying objects of the object type;
    executing the set of instructions for the application; and
    iteratively building the application, each iteration comprising:
        receiving a modification to the declarative specification including a modified version of the object type;
        modifying the set of instructions for the application to obtain a modified set of instructions configured to generate a modified user interface to match the modified version of the object type; and
        executing the modified set of instructions to display the modified user interface.

2. The computer-implemented method of claim 1, wherein executing the modified set of instructions to display the modified user interface comprises:
    receiving an input at a displayed input field corresponding to an object of the object type; and
    updating a record in a database connected to the application in response to the input.

3. The computer-implemented method of claim 1, wherein iteratively building the application is performed using a staging server, further comprising:
    deploying a final version of the application on a production system based on a final modified specification obtained from a final iteration.

4. The computer-implemented method of claim 1, wherein iteratively building the application is performed via a user interface of a development environment, comprising:
    a first portion of the user interface for modifying the declarative specification of the application; and
    a second portion of the user interface for executing the application corresponding to the declarative specification.

5. The computer-implemented method of claim 1, wherein the declarative specification includes a data entry command for an object, the computer-implemented method comprising:
    generating instructions for data entry of a field of the object for inputting via the user interface of the application.

6. The computer-implemented method of claim 1, wherein the application is a first application and wherein the declarative specification describes a second application, wherein the set of instructions cause objects of the object type to be synchronized with data of the second application.

7. The computer-implemented method of claim 1, wherein a reference to the object type is associated with a data entry element for data entry of objects of the object type, wherein the object type is a first object type, wherein an attribute of the object type is an instance of a second object type, wherein the data entry element for data entry of objects of the first object type is configured to:

access a set of objects of the second object type from a database connected to the application and display a list, and allow a user to select an element from the set of objects.

8. The computer-implemented method of claim 1, wherein a reference to the object type is associated with a data entry element for data entry of objects of the object type, wherein the declarative specification identifies an application programming interface (API), wherein the data entry element for data entry of objects of the object type is associated with an invocation of the API, wherein the user interface of the application is configured to provide data input to fields of the user interface as parameters to an invocation of the API.

9. The computer-implemented method of claim 1, wherein a reference to the object type is associated with a display element for display of objects of the object type, wherein the declarative specification identifies an application programming interface (API), wherein the display element of objects of the object type specifies an invocation of the API, such that a display field corresponding to an attribute of the object type obtains value by invoking the API.

10. A non-transitory computer readable storage medium storing instructions that when executed by a computer processor cause the computer processor to execute steps for generating an application from a declarative specification, the steps comprising:

receiving the declarative specification comprising a description of an object type, and one or more references to objects of the object type;

generating an initial version of the application from the declarative specification comprising, a set of instructions for configuring a user interface for inputting or displaying objects of the object type;

executing the set of instructions for the application; and iteratively building the application, each iteration comprising:

receiving a modification to the declarative specification including a modified version of the object type;

modifying the set of instructions for the application to obtain a modified set of instructions configured to generate a modified user interface to match the modified version of the object type; and executing the modified set of instructions to display the modified user interface.

11. The non-transitory computer readable storage medium of claim 10, wherein executing the modified set of instructions to display a modified user interface comprises steps comprising:

receiving an input at a displayed input field corresponding to an object of the object type; and updating a record in a database connected to the application in response to the input.

12. The non-transitory computer readable storage medium of claim 10, wherein iteratively building the application is performed using a staging server, comprising:

deploying a final version of the application on a production system based on a modified specification obtained from a final iteration.

13. The non-transitory computer readable storage medium of claim 10, wherein iteratively building the application is performed via a user interface of a development environment, the user interface comprising:

a first portion of the user interface for modifying the declarative specification of the application; and a second portion of the user interface for executing the application corresponding to the declarative specification.

14. The non-transitory computer readable storage medium of claim 10, wherein the declarative specification includes a data entry command for an object, the instructions further causing the computer processor to perform steps comprising:

generating instructions for data entry of a field of the object for inputting via the user interface of the application.

15. The non-transitory computer readable storage medium of claim 10, wherein the application is a first application and wherein the declarative specification describes a second application, wherein the set of instructions cause objects of the object type to be synchronized with data of the second application.

16. The non-transitory computer readable storage medium of claim 10, wherein a reference to the object type is associated with a data entry element for data entry of objects of the object type, wherein the object type is a first object type, wherein an attribute of the object type is an instance of a second object type, wherein the data entry element for data entry of objects of the first object type is configured to:

access a set of objects of the second object type from a database connected to the application and display a list, and allow a user to select an element from the set of objects.

17. The non-transitory computer readable storage medium of claim 10, wherein a reference to the object type is associated with a data entry element for data entry of objects of the object type, wherein the declarative specification identifies an application programming interface (API), wherein the data entry element for data entry of objects of the object type is associated with an invocation of the API, wherein the user interface of the application is configured to provide data input to fields of the user interface as parameters to an invocation of the API.

18. The non-transitory computer readable storage medium of claim 10, wherein a reference to the object type is associated with a display element for display of objects of the object type, wherein the declarative specification identifies an application programming interface (API), wherein the display element for display of objects of the object type specifies an invocation of the API, such that a display field corresponding to an attribute of the object type obtains value by invoking the API.

19. A computer system comprising:

a computer processor; and a non-transitory computer readable storage medium storing instructions that when executed by a computer processor cause the computer processor to execute steps for generating an application from a declarative specification, the steps comprising:

receiving the declarative specification comprising a description of an object type, and one or more references to objects of the object type;

generating an initial version of the application from the declarative specification comprising, a set of instructions for configuring a user interface for inputting or displaying objects of the object type;

executing the set of instructions for the application; and iteratively building the application, each iteration comprising:

receiving a modification to the declarative specification including a modified version of the object type;

modifying a set of instructions for the application to obtain a modified set of instructions configured to generate a modified user interface to match the modified version of the object type; and executing the modified set of instructions to display the modified user interface.

20. The computer system of claim 19, wherein iteratively building the application is performed via a user interface of a development environment, the user interface comprising:

a first portion of the user interface for modifying the declarative specification of the application; and a second portion of the user interface for executing the application corresponding to the declarative specification.

* * * * *